US005778066A

United States Patent [19]

Shah et al.

[11] Patent Number: 5,778,066

[45] Date of Patent: Jul. 7, 1998

[54] METHOD AND APPARATUS FOR AUTHENTICATION OF POSTAGE ACCOUNTING REPORTS

[75] Inventors: Chandrakant J. Shah, Stockton, Calif.; Dennis T. Gilham, Hutton, United Kingdom

[73] Assignee: F.M.E. Corporation, Hayward, Calif.

[21] Appl. No.: 561,662

[22] Filed: Nov. 22, 1995

[51] Int. Cl.[6] .......... H04L 9/00

[52] U.S. Cl. .......... 380/24; 380/51

[58] Field of Search .......... 380/24, 51; 364/464.13; 395/201

[56] References Cited

U.S. PATENT DOCUMENTS

| | | | |
|---|---|---|---|
| 3,652,795 | 3/1972 | Wolf et al. . | |
| 3,792,446 | 2/1974 | McFiggins et al. . | |
| 3,890,599 | 6/1975 | Simjian . | |
| 3,938,095 | 2/1976 | Check, Jr. et al. . | |
| 3,978,457 | 8/1976 | Check, Jr. et al. . | |
| 3,990,558 | 11/1976 | Ehrat . | |
| 4,097,923 | 6/1978 | Eckert, Jr. et al. . | |
| 4,122,532 | 10/1978 | Dlugos et al. . | |
| 4,168,533 | 9/1979 | Schwartz . | |
| 4,252,537 | 2/1981 | Cattran et al. . | |
| 4,253,158 | 2/1981 | McFiggans . | |
| 4,319,328 | 3/1982 | Eggert . | |
| 4,376,299 | 3/1983 | Rivest . | |
| 4,725,718 | 2/1988 | Sansone et al. | 235/495 |
| 4,743,747 | 5/1988 | Fougere et al. | 235/494 |
| 4,757,537 | 7/1988 | Edelmann et al. | 380/51 |
| 4,760,532 | 7/1988 | Sansone et al. . | |
| 4,760,534 | 7/1988 | Fougere et al. . | |
| 4,802,218 | 1/1989 | Wright et al. | 380/51 |
| 4,831,555 | 5/1989 | Sansone et al. | 364/519 |
| 4,864,618 | 9/1989 | Wright et al. | 380/51 |
| 4,949,381 | 8/1990 | Pastor | 380/51 |
| 5,005,124 | 4/1991 | Connell et al. | 395/201 |
| 5,077,792 | 12/1991 | Herring | 380/24 |
| 5,181,245 | 1/1993 | Jones | 380/52 |
| 5,319,562 | 6/1994 | Whitehouse | 364/464.13 |
| 5,375,172 | 12/1994 | Chrosny | 380/51 |
| 5,390,251 | 2/1995 | Pastor | 380/51 |
| 5,480,239 | 1/1996 | Kim et al. | 400/120.09 |
| 5,602,742 | 2/1997 | Solondz et al. | 364/464.13 |

OTHER PUBLICATIONS

Brochure entitled "RPS Multicodebar Code Label Guide," RPS Roadway Package System, Draft of May 1995, Revision 2, pp. 41–42.

AIM USA Technical Specification entitled "Data Matrix, " AIM USA Technology Group, Pittsburgh, Pennsylvania, Draft of May 18, 1995, 89 pages.

*Primary Examiner*—Salvatore Cangialosi
*Attorney, Agent, or Firm*—Townsend and Townsend and Crew LLP

[57] ABSTRACT

Apparatus and method for authentication of postage accounting reports. Postage accounting report data is authenticated by first assembling authentication mark data from the postage accounting report data and encrypting the resultant information to form an authentication mark. A physical representation of that authentication mark is then affixed to a postage accounting report generated by a postage accounting report system. The postage accounting report may subsequently be authenticated by communicating the authentication mark to a responsible party (for example, a postal authority or manufacturer) for purposes of decrypting the authentication mark and authenticating the postage accounting report data using the decrypted information.

15 Claims, 4 Drawing Sheets

METHOD AND APPARATUS FOR AUTHENTICATION OF POSTAGE ACCOUNTING REPORTS

CROSS REFERENCE TO RELATED APPLICATIONS

The following three commonly-owned copending applications, including this one, are being filed concurrently and the other two are incorporated by reference into this application:

C. Shah and D. T. Gilham, entitled "Method and Apparatus for Authentication of Postage Accounting Reports" (U.S. patent application Ser. No. 08/561,662, filed Nov. 22, 1995, pending);

C. Shah and K. Robertson, entitled "Method and Apparatus for Authentication of Postage Accounting Data Files" (U.S. patent application Ser. No. 08/562,143, filed Nov. 22, 1995, pending); and C. Shah and K. Robertson, entitled "Method and Apparatus for a Modular Postage Accounting System" (U.S. patent application Ser. No. 08/562,268, filed Nov. 22, 1995, pending).

BACKGROUND OF THE INVENTION

The present invention relates generally to a method and apparatus for authentication of postage accounting reports. More specifically, the present invention allows the authentication of reports generated from postage accounting data maintained in a general purpose computer.

Historically, postage meters have been dedicated, standalone devices, capable only of printing postage indicia on envelopes or labels (in the case of parcels), and resided at a user's site. As such, these devices could provide postage metering only for that particular site and required the user to physically transport the device to a post office for resetting (increasing the amount of postage contained in the meter). These were secure devices which contained mechanical (later, electronic digital) accounting registers that dispensed postage in isolation from other systems (computer and otherwise). An advance over this system was the ability to reset meters via codes communicated to the user. These codes were provided by either the manufacturer or the postal authority, once payment by the customer had been made.

In contrast, modern electronic meters are often capable of being reset directly by an authorized party, on-site (at the user's location) via a communications link. A system which performs meter resetting in this manner is known as a Computerized Meter Resetting System (or "CMRS"). The party having authority to reset the meter and charge the customer (usually the manufacturer or the postal authority) thus gains access to, and resets the meter. Mail accounting data, i.e., detailed accounting of postage expenditures (for example, reports of postage expended by different departments in a company) may be accumulated and read from the more sophisticated electronic meters, but at best the user must still download data in a batch mode or enter it manually into a general accounting system. Moreover, such systems provide no means for authenticating the postage accounting information with regard to the actual values held in the meter.

SUMMARY OF THE INVENTION

According to the present invention, an apparatus and method are described for authentication of postage accounting reports. Postage accounting report data is authenticated by first assembling authentication mark data from the postage accounting report data and secure metering device (SMD). The system then encrypts the resultant information to form an authentication mark. A physical representation of that authentication mark is subsequently affixed to a postage accounting report, which is generated by the postage accounting report system. The postage accounting report may subsequently be authenticated by communicating the authentication mark to a responsible party (for example, a postal authority or manufacturer) for purposes of decrypting the authentication mark and authenticating the postage accounting report. The validity of the information in the report is thus verified, along with information as to the party originating the information, the computer system used and other data pertinent to identifying sources of fraudulent postage accounting data.

The present invention supports departmentalized accounting, centralization of remote postage accounting and identification of fraudulent reports. The presence of a valid authentication mark identifies a report as having been generated by the accounting program, which in turn confirms that it is based on authenticated data held in the system. A counterfeit can be detected by decrypting the authentication mark, as the authenticating details will be incorrect or missing if the report is fraudulent.

A further understanding of the nature and advantages of the present invention may be realized by reference to the remaining portions of the specification and the drawings.

DESCRIPTION OF THE PREFERRED EMBODIMENT

I. Introduction

In the near future, systems will allow the use of existing general purpose computing resources to provide postage delivery at a user's site, allowing efficient, economical printing of postage indicia. Such systems will furnish postage at a user's location upon request, and are exemplified by the system described in the copending application (filed concurrently with this application) entitled "Method and Apparatus for a Modular Postage Accounting System," by C. Shah and K. Robertson, the disclosure of which has already been incorporated herein by reference. Using well known techniques for the encryption of data within what are known as "trusted systems," such postage delivery systems use ordinary computers and printers to print encrypted postage indicia while maintaining and updating postage accounting data within the general purpose computer's memory. By isolating the three basic postage registers within a separate device (the SMD), all functions other than overall postage accounting can then be performed in a general purpose computer. Security of SMD register data and validation of postage printing transactions will depend on standard encryption techniques and physical security.

II. An Example of Postage Metering Using an Open System

Figure 1:
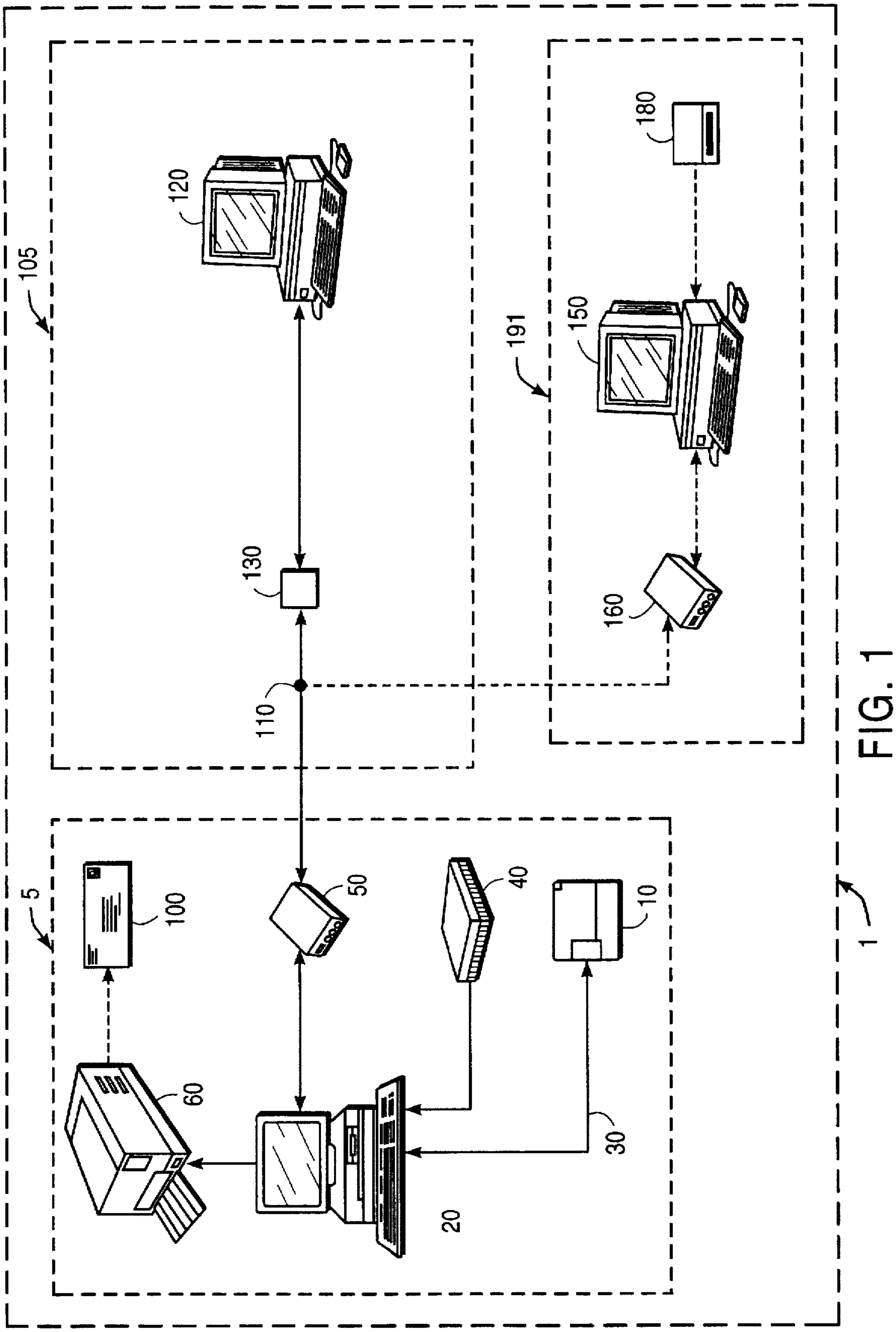
FIG. 1 is a diagram showing an example of a modular postage accounting system.

FIG. 1 is a diagram showing an example of an Modular Postage Accounting System (MPAS). A secure communications means 30 connects a secure metering device (SMD) 10 to a general purpose computer (GPC) 20. Secure communications means 30 may be any means of transferring information that is impervious to unauthorized interception, such as an RS-232C serial communications line or a direct internal connection to GPC 20 (i.e., resident on the data/address bus of GPC 20). These techniques may be combined with encryption of the postage information. SMD 10 contains two battery augmented memories (BAMs, not shown) for providing non-volatile storage of postage accounting information. This postage information, as is well known in the art, typically consists of an ascending register, a descending register and a control total register (none of which are shown). As is also well-known in the art, an ascending register holds a value equal to the amount of postage used, a descending register holds a value equal to the amount of postage which remains unused and a control total register holds the sum of the ascending register and descending register. SMD 10 may also contain a real-time clock and memory (neither of which is shown). Encryption may be performed by a hardware encryptor or by software algorithm (for instance, the DES or RSA algorithms). SMD 10 may contain postage accounting information for one or more departments within a customer's organization, which may be widely dispersed geographically. SMD 10 performs the accounting functions generally associated with the traditional postage meter and generates encrypted postage indicia. GPC 20 is also connected to a communications interface device 50, which provides access to a computerized meter resetting system (CMRS) 105 via a communications medium 110. A resetting station computer 120 communicates with GPC 20 and SMD 10 to perform resets (add postage value to SMD 20), accounting/auditing operations and other functions as required.

Communication between GPC 20 and SMD 10 is bi-directional. GPC 20 sends control commands and information requests to SMD 10. SMD 10, in return, may send human-readable data (in response to information requests), postage indicia (in response to postage requests and which are encrypted) or both. For example, postage is requested by a user (not shown) by the user's entering postage information into GPC 20. GPC 20 sends this information, together with mail class/service, any other values required (e.g., insurance) and the destination ZIP-code to SMD 20. In turn, SMD 10 responds by generating a secure (via encryption) postage indicia file together with a license number and transmitting that information to GPC 20. GPC 20 takes the information provided by SMD 10 and constructs a postage indicia print file comprising a two-dimensional code, graphical information and human-readable data. The postage indicia print file, together with optional information (such as address information, ZIP-code barcoding and any user-defined information) is transmitted to printer 60 for printing. Printer 60 then imprints the postage indicia and other information onto an envelope (mailpiece 100), a label (not shown) or other means of affixation of postage. GPC 20 may also access CMRS 105 for resetting SMD 10, auditing by postal authorities and other purposes. This allows for resetting (the entry of postage credit) in a manner similar to conventional electronic postage meters.

III. Authentication of Postage Accounting Reports

The present invention uses the above described interface between SMD 10 and GPC 20 to maintain postage accounting information, which may subsequently be used to create reports. A record of each transaction, running totals or both are maintained by comparing accounting information stored on the GPC to the running totals residing in the SMD. Postage accounting reports may then be authenticated by an encrypted "authentication mark", which contains (in encrypted form) the serial number, post office license number and running totals of the SMD, along with any other identifying data, such as the operator's identity, date and time, and so on, that the user may require.

Figure 2:
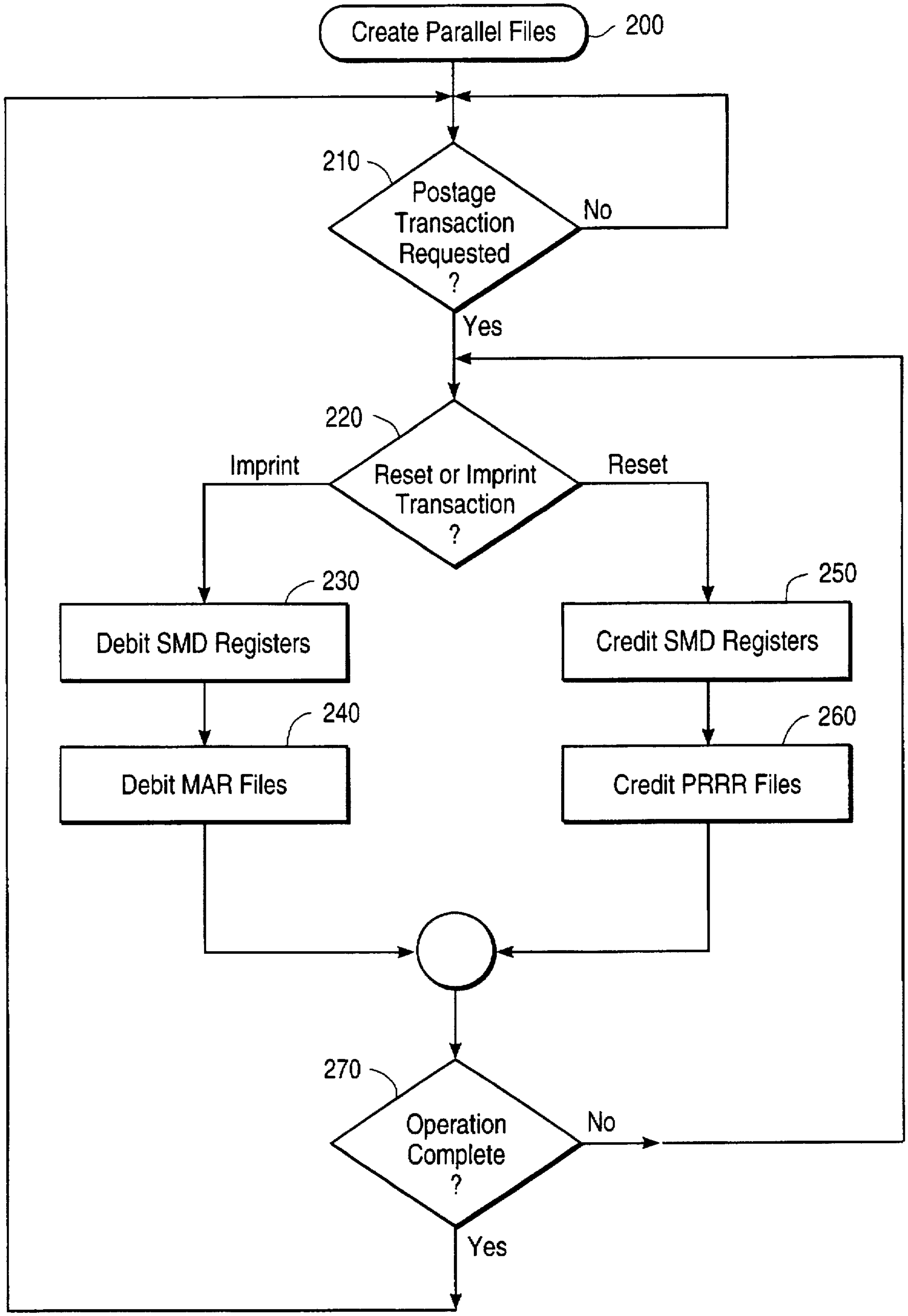
FIG. 2 is a flowchart showing a specific embodiment of the present invention, specifically the maintenance of parallel postage accounting files.

Record keeping in the MPAS is shown in FIG. 2 and typically proceeds as follows. First, files are created in the SMD and GPC, as shown in step 200 of FIG. 2. In step 210, the SMD and GPC await a transaction request from the user. When a transaction is requested, a decision is made at step 220 as to whether the user has requested an imprint transaction or reset transaction. Other transactions may occur at this point, but are not shown for the sake of clarity. Copending application entitled "Method and Apparatus for a Modular Postage Accounting System," by C. Shah and K. Robertson, should be referenced for a more complete listing of these communications.

If the user selects a reset transaction, funds spent to add credit to (or "reset") the SMD are accounted for in the SMD's BAMs and also in the file residing in the GPC containing the Postage Reset Payment Record (PRPR). This transaction is reflected in steps 230 and 240. If the user selects an imprint transaction, the postage expenditure that offsets the SMD stored credit (i.e., a debit, or use of the metering system) is again accounted for in the BAMs, and also in files residing in the GPC containing the Mail Accounting Report (MAR) data, which details postage use by the department. This departmentalized accounting data is generated and stored in the SMD registers, and is also generated and stored separately in files in GPC 20. This transaction is reflected in steps 250 and 260.

Figure 3:
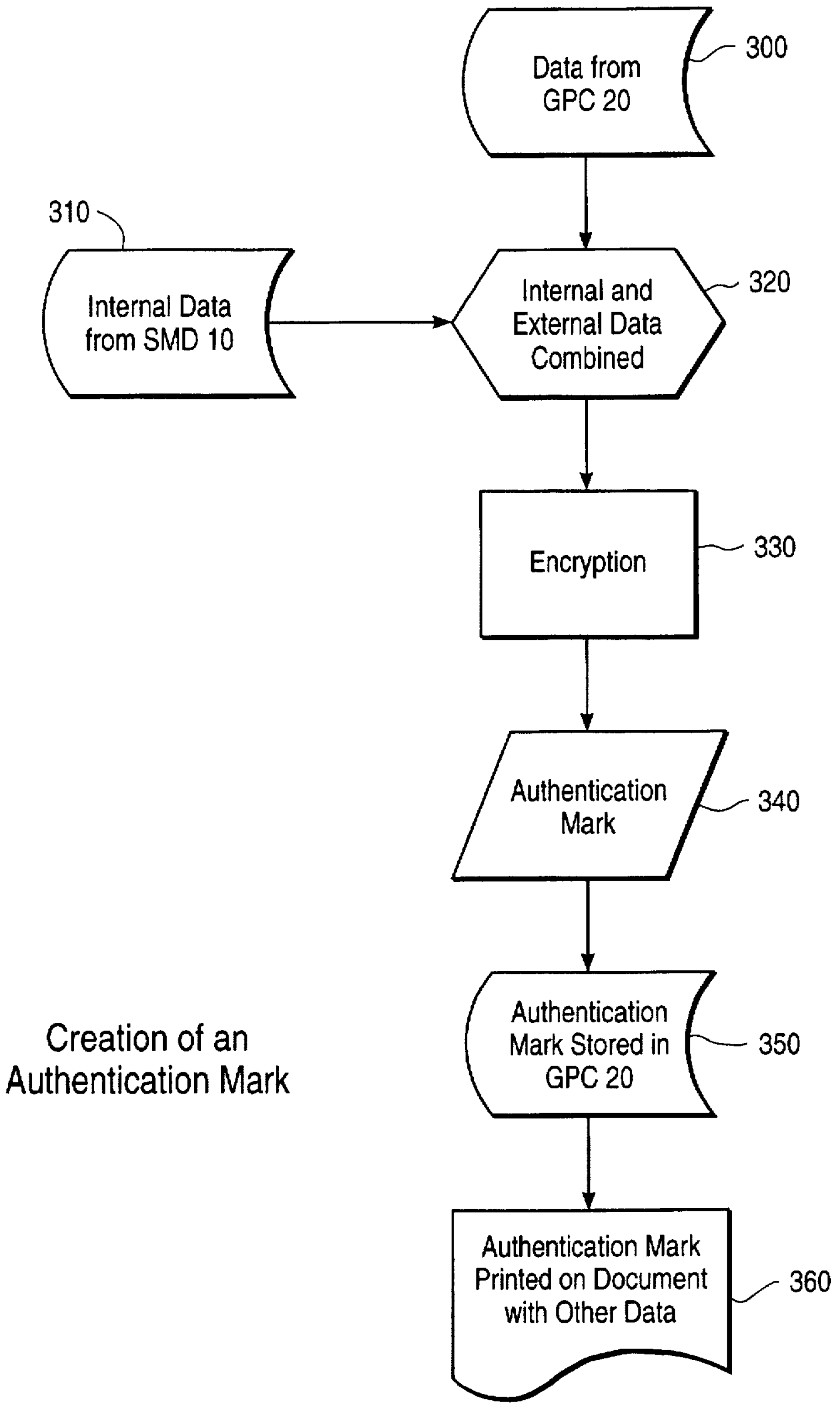
FIG. 3 is a flowchart showing a specific embodiment of the present invention, specifically the creation of an authentication mark.

Subsequently, when MARs or PRPRs are generated, they are authenticated by comparing the records residing on the SMD and the parallel records residing on the GPC. Once the data in question is authenticated, the physical report may be generated, as shown in FIG. 3. GPC data 300 and internal SMD data 310 are combined inside the SMD in step 320. These components are encrypted in step 330 and may consist of any or all of the following:

SMD's serial number
SMD's post office license number
Time and date report was generated
Computer (or main frame terminal) serial/ID number
Department number (of department initiating the report)
Operator's identifying password or ID number
Summary totals of report Other information, as deemed useful, may also be included with the above information. Once encrypted, this information forms an authentication mark 340, which is stored in the GPC (as shown in step 350). The report, having already been generated and now including the authentication mark, is then printed at step 360.

Figure 4:
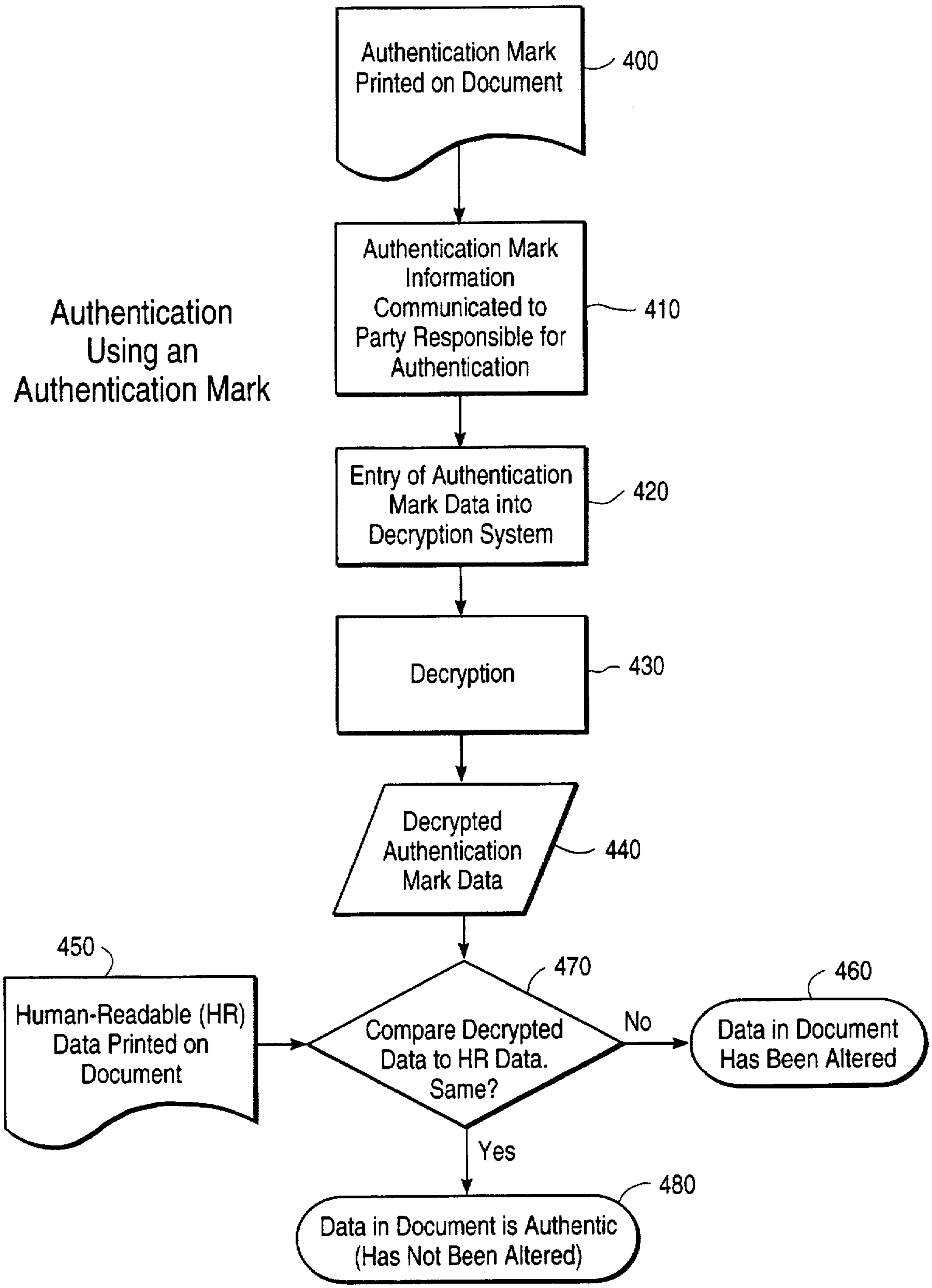
FIG. 4 is a flowchart showing a specific embodiment of the present invention, specifically the authentication of a postage accounting report using an authentication mark.

The authenticity of MARs and PRPRs may then be verified by this authentication mark, as shown in FIG. 4. An authentication mark 400 is communicated at step 410 to the party responsible for authentication of reports (the authenticating party, typically the postal authority or manufacturer). At step 420, the authenticating party enters the authentication mark data into a decryption system. The authentication mark is then decrypted (step 430), resulting in decrypted authentication mark data 440, which is then compared to human-readable data 450 (step 470). If decrypted authentication mark data 440 and human-readable data 450 differ, some or all of the data in the report has been altered (step 460). Counterfeit authentication marks will be detected by decrypting because of either incorrect or missing authentication information. Otherwise, the report data is verified as being authentic (step 480). The authentication mark's conversion to plain text by means of an appropriate decryption algorithm thus reveals the components in a readable form and authenticates the valid identity of the report document. The presence of a valid authentication mark identifies a report as having actually been generated by the accounting program, which in turn confirms that it is based on authentic data held in the SMD and GPC.

Thus, the present invention allows automatic checking of accounting report data against secure postage revenue data and produces an encrypted authentication mark for the authentication of mail accounting and reset payment record reports. Authentication thus provides insurance against tampering with the MPAS metering system and unauthorized use thereof.

Moreover, while the invention has been particularly shown and described with reference to these specific embodiments, it will be understood by those skilled in the art that the foregoing and other changes in the form and details may be made therein without departing from the spirit or scope of the invention. For example, the present invention should not be limited by any one method of affixing the authentication mark, as alphanumerics, barcodes, data matrices or other techniques may be employed. Information included in the authentication mark may likewise vary with the user's needs. Consequently, the scope of the invention should be determined with reference to the appended claims.

What is claimed is:

1. A method of authenticating postage accounting report data, comprising the steps of:

maintaining a first set of postage accounting data within a secure metering device and a second set of postage accounting data within a general purpose computer, said secure metering device coupled to said general purpose computer;

comparing said second set of said postage accounting data with said first set of said postage accounting data, and, if said second set of said postage accounting report data agrees with said first set of said postage accounting report data, generating authentication mark data from said second set of postage accounting report data;

encrypting said authentication mark data to produce an authentication mark; and affixing said authentication mark to a postage accounting report.

2. The method of claim 1, further comprising the steps of:

communicating said authentication mark to an authority for purposes of decrypting said authentication mark and recovering said authentication mark data; and comparing said authentication mark data to the postage accounting report data for purposes of authenticating the postage accounting report data.

3. The method of claim 2 whereby an authenticated report is generated as part of a postage revenue accounting system, using said general purpose computer, wherein said general purpose computer is an element of a modular postage accounting system.

4. The method of claim 3 wherein said first set of postage accounting data represents report totals maintained in said general purpose computer and said second set of postage accounting data represents postage revenue register data stored in said secure metering device.

5. A postage accounting report generation system wherein postage accounting reports are authenticated by means of an encrypted authentication mark.

6. The apparatus of claim 5, wherein said authentication mark indicates said first set of postage accounting data agreed with said second set of postage accounting data at a time when said postage accounting report was printed.

7. The apparatus of claim 6, wherein said postage accounting reports are generated as a part of a postage revenue accounting system, using said general purpose computer, wherein said general purpose computer is an element of a modular postage accounting system.

8. The apparatus of claim 7, wherein postage accounting report data is automatically validated by comparing postage accounting report totals stored in said secure metering device to postage revenue register data within said modular postage accounting system, wherein said postage register revenue data is represented by said first set of postage accounting data and said postage accounting report totals are represented by said second set of postage accounting data.

9. A method of authenticating postage accounting report data, comprising the steps of:

maintaining a first set of postage accounting data within a secure metering device and a second set of postage accounting data within a general purpose computer, said secure metering device coupled to said general purpose computer;

comparing said second set of said postage accounting data with said first set of said postage accounting data, and, if said second set of said postage accounting report data agrees with said first set of said postage accounting report data, generating an authentication mark, and printing a postage accounting report having said authentication mark affixed thereto.

10. The method of claim 9, wherein said comparing step comprises the steps of:

downloading at least a portion of said second set of postage accounting data from said general purpose computer to said secure metering device;

performing a comparison of said at least said portion of said second set of postage accounting data with at least a portion of said first set of postage accounting data, said comparison being performed within said secure metering device; and sending a result of said comparison from said secure metering device to said general purpose computer.

11. The method of claim 9, wherein said step of generating an authentication mark comprises the steps of:

deriving authentication mark data from said second set of said postage accounting report data; and generating said authentication mark by encrypting said authentication mark data.

12. The method of claim 9, wherein said step of generating an authentication mark comprises the steps of:

printing said second set of said postage accounting report data as said postage accounting report, and affixing said authentication mark to said postage accounting report.

13. The method of claim 9, wherein said maintaining step comprises the steps of:

initializing a first postage accounting report data register within said secure metering device;

creating a second postage accounting report datafile in said general purpose computer; and upon said secure metering device receiving a transaction request from said general purpose computer, determining a type of said transaction request, and, if said type is an imprint transaction, debiting postage value in said postage accounting report data register, and recording said debiting in said first and said second postage accounting report datafiles, and if said type is a reset transaction, crediting postage value in said postage accounting report data register, and recording said crediting in said first and said second postage accounting report datafiles.

14. The method of claim 13, wherein said maintaining step further comprises the step of maintaining departmentalized accounting data in said general purpose computer by maintaining a separate file in said general purpose computer for each one of a plurality of departments.

15. The method of claim 9, further comprising the steps of:

communicating an authentication mark to an authenticating party;

entering said authentication mark data into a verification system;

generating decoded authentication mark data by decoding said authentication mark; and comparing said decoded authentication mark to postage accounting report data on said postage accounting report, and, if said decoded authentication mark data agrees with said postage accounting report data, indicating said postage accounting report is authentic, and, otherwise, indicating said postage accounting report is not authentic.

* * * * *

UNITED STATES PATENT AND TRADEMARK OFFICE
CERTIFICATE OF CORRECTION

PATENT NO. : 5,778,066
DATED : July 7, 1998
INVENTOR(S) : Chandrakant J. Shah and Dennis T. Gilham It is certified that error appears in the above-identified patent and that said Letters Patent is hereby corrected as shown below:

<u>Column 6,</u>
Claim 5 should read:

5. A postage accounting report generation system comprising:

a general purpose computer configured to maintain a first set of postage accounting data;

a secure metering device coupled to said general purpose computer and configured to maintain a second set of postage accounting data, to generate authentication mark data by virtue of being configured to compare said first and said second sets of postage accounting data, and to generate an encrypted authentication mark by virtue of being configured to encrypt said authentication mark data;

a printer coupled to said general purpose computer and configured to print said first set of postage accounting data and said encrypted authentication mark as a postage accounting report.

Signed and Sealed this

Twentieth Day of November, 2001

*Attest:*

Nicholas P. Godici

NICHOLAS P. GODICI

*Attesting Officer* *Acting Director of the United States Patent and Trademark Office*